(No Model.)
G. H. TANSLEY.
VALVE FOR PNEUMATIC TIRES.
No. 533,973. Patented Feb. 12, 1895.
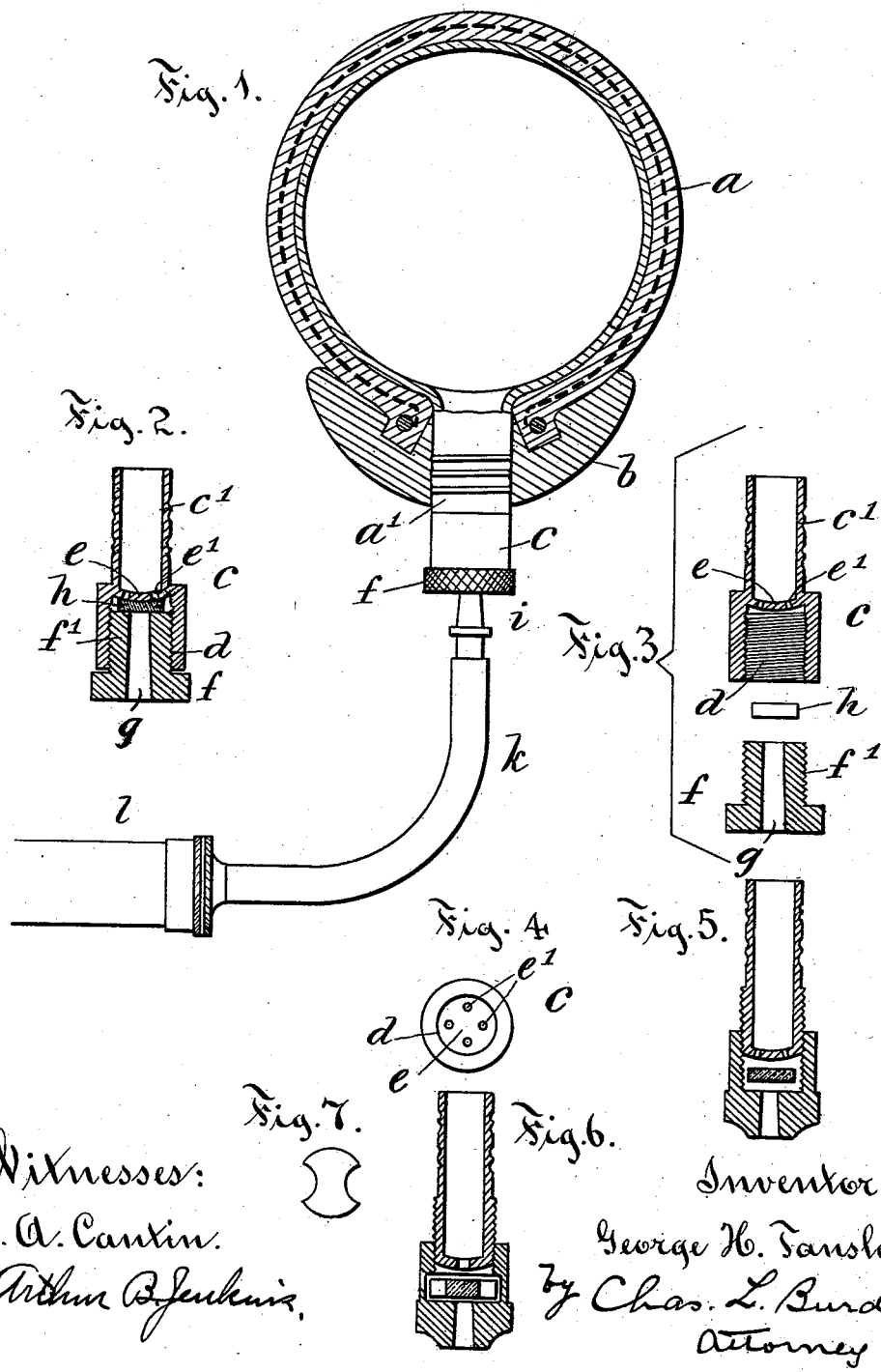

UNITED STATES PATENT OFFICE.

GEORGE H. TANSLEY, OF HARTFORD, CONNECTICUT, ASSIGNOR OF TWO-THIRDS TO AMOS WHITNEY AND WILLIAM W. TUCKER, OF SAME PLACE.

VALVE FOR PNEUMATIC TIRES.

SPECIFICATION forming part of Letters Patent No. 533,973, dated February 12, 1895.

Application filed September 24, 1894. Serial No. 523,953. (No model.)

*To all whom it may concern:*

Be it known that I, GEORGE H. TANSLEY, a citizen of the United States, and a resident of Hartford, in the county of Hartford and State of Connecticut, have invented certain new and useful Improvements in Valves for Pneumatic Tires, of which the following is a full, clear, and exact description, whereby any one skilled in the art can make and use the same.

The object of my invention is to provide a simple and effective form of valve which shall be particularly adapted for use on pneumatic tires in inflating and also for readily deflating the tire.

To this end my invention consists in the details of the several parts making up the valve and in the combination of such parts with a tire or other structure intended to hold air under pressure as more particularly hereinafter described and pointed out in the claims.

Referring to the drawings: Figure 1 is a detail view in cross section through the rim of a wheel fitted with a pneumatic tire, showing the improved valve connected to the tire on the rim. Fig. 2 is a detail view in central section through the valve showing the parts closed. Fig. 3 is a detail view in central section through the parts of the valve, showing the several parts separated but arranged in line showing the relative position. Fig. 4 is a detail plan view of the valve with the cap removed. Fig. 5 is a detail view in central section of a modified form of valve body and cap. Fig. 6 is a detail view of a modified form of valve. Fig. 7 is a plan view of the elastic valve.

In the accompanying drawings the letter $a$ denotes a pneumatic tire or like article requiring a valve to retain the air or other fluid under pressure the tire being the article to which my invention is more particularly adapted and such tire being fitted on a rim $b$ of a wheel. The valve tube $a'$ projects through a hole in the rim and to it is secured a valve $c$.

The valve consists of a body part $c'$ adapted to fit within the valve tube and preferably having exterior corrugations into which the substance of the tube is forced by a binding wire wrapped about the outside of the tube. The body part $c'$ of the valve has a socket $d$ in the bottom of which is a valve seat $e$ curved upward toward the socket and having ports $e'$ through the diaphragm, the upper part of which forms the seat. The side walls of the socket are screw threaded and adapted to receive the threaded stem $f'$ of the cap $f$. This cap has a perforation $g$ preferably central, and within the socket and between the end of the stem and the valve seat there is located a valve $h$ of elastic material, preferably of india rubber. This valve is disk shaped and is of a diameter slightly less than the interior diameter of the socket and broad enough to overlie the ports which open through the diaphragm. The stem is of sufficient length to press the valve upon the seat so as to securely close the ports. The ports should be closed by the elastic material of the valve in order to prevent any possible leakage of air between the interengaging portions of the valve body and the stem.

The opening $g$ through the stem is preferably tapered to receive the tapered end of the nipple $i$ which is secured to the flexible tube $k$ of an air pump $l$ so as to form a comparatively firm connection between the pump and the valve for the purpose of inflating the tire. Other means may obviously be provided, however, for the proper connection, of the pump to the valve for the purpose of inflating the tire.

The operation of the device is as follows: The valve $h$ being in place in the socket the stem is unscrewed to an extent sufficient to allow the valve to lift from the seat, the nipple $i$ being firmly inserted in the opening $g$. By means of the pump air under pressure is forced into the socket and passes through the ports $e'$ into the tire the outward pressure carrying the valve $h$ against the inner end of the opening $g$ except as the pressure from the pump exceeds the pressure within the tire so that the valve prevents leakage of air during the operation of pumping. As soon as the tire is inflated to the desired degree of hardness the cap is at once screwed in until the valve $h$ is down on its seat and compressed between such seat and the inner end of the stem. The nipple $i$ is then removed and the tire is in condition for use. When it is desired to deflate a tire the cap is unscrewed a short distance, the valve $h$ falling outward with the cap and being pressed against its under surface. By means of a wire or like implement inserted through the opening $h$ the valve is pushed away from the end of the stem and the air allowed to escape through the opening $g$. The curved shape of the valve seat is important in providing for the lifting of the valve from the seat in the operation of inflating the tire.

As a modified form of the invention I make the socket in the cap and cut the thread on the outside of the body part of the valve as shown in Fig. 5 of the drawings, the diaphragm in such case being formed at the outer end of the body part and in position to thrust against the loose rubber valve located in the socket in the cap.

In order to prevent the accidental removal of the elastic valve that part of the socket in which the valve is located in the valve body and as shown in Fig. 6 is made larger in diameter than the threaded portion of the socket so as to form a shoulder, the valve being made slightly larger in diameter also. Such a valve is thrust into place in the socket but is loose therein so as to lift readily from the seat when the cap is partly unscrewed, either for inflating or deflating the tire, and cannot drop out of place when the cap is unscrewed from the valve body.

The port or opening for the passage of air through the diaphragm forming a valve seat is preferably located at one side of the raised center of the seat to obtain the best results, the location of the ports as shown in Figs. 2, 3, 4 and 5 being preferable, but the particular number of such ports does not form the essential feature of the invention, it being one feature of advantage to have such port as may exist located out of the center of the valve seat which is higher in the center than on the side parts.

I claim as my invention—

1. In a valve in combination with a tubular valve body having a diaphragm with ports therethrough, the rounded valve seat on the diaphragm, a valve socket having threaded walls, a cap having a perforated and threaded stem fitting the thread on the walls of the valve socket, and an elastic valve located within the socket and loosely held between the ends of the valve stem and the valve seat, all substantially as described.

2. In combination with a pneumatic tire, a valve secured thereto and comprising a tubular valve body with a diaphragm having ports therethrough, the outer surface of the diaphragm being rounded to form a valve seat, a valve socket having threaded walls, a cap having a threaded stem projecting within the socket, a central perforation through the cap and stem, and a disk shaped valve of india rubber less in diameter than the valve socket and with the edges of the valve overlying and extending beyond the ports through the diaphragm, all substantially as described.

3. In combination with a pneumatic tire, a tubular valve body secured thereto, a diaphragm within the valve body having a port therethrough, a removable body part or cap screw threaded to fit the other body part of the valve, a shouldered valve socket within the valve body, a disk shaped valve of elastic material less in diameter than the valve socket and overlying the port through the diaphragm, the removable portion of the valve body being provided with means for connecting the air pump thereto, all substantially as described.

4. In combination in an air valve, a tubular valve body, a diaphragm within the valve body having an air port therethrough, and a rounded valve seat, a valve of elastic material less in diameter than the valve socket and overlying the air port through the diaphragm, a removable section of the valve body screw threaded to fit the other section, and means on the outer removable section of the valve body for connecting an air pump thereto, all substantially as described.

5. In combination in an air valve, a tubular body part having a diaphragm with a valve seat raised in the center, and an air port therethrough, said port being located out of the center of the valve seat, an adjustable section of the valve body screw threaded for attachment to the other section, a shouldered valve socket within the valve body, a valve of elastic material located within the socket less in diameter than the socket and overlying the port, means on the outer section of the valve body for connecting an air pump thereto, all substantially as described.

GEORGE H. TANSLEY.

Witnesses:
CHAS. L. BURDETT,
J. A. CANTIN.